United States Patent
Horn et al.

(10) Patent No.: US 12,537,659 B2
(45) Date of Patent: Jan. 27, 2026

(54) MAPPING OF TIME AND FREQUENCY RESOURCES TO BEAMS OF A NETWORK NODE

(71) Applicant: QUALCOMM Incorporated, San Diego, CA (US)

(72) Inventors: Idan Michael Horn, Hod Hasharon (IL); Yehonatan Dallal, Kfar Saba (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 17/821,119

(22) Filed: Aug. 19, 2022

(65) Prior Publication Data

US 2024/0063989 A1    Feb. 22, 2024

(51) Int. Cl.
*H04L 5/00* (2006.01)
*H04W 72/23* (2023.01)

(52) U.S. Cl.
CPC .......... *H04L 5/0098* (2013.01); *H04L 5/0005* (2013.01); *H04W 72/23* (2023.01)

(58) Field of Classification Search
CPC .... H04L 5/0098; H04L 5/0005; H04W 72/23; H04W 88/04; H04W 72/046; H04B 7/026; H04B 7/088; H04B 7/15528; H04B 7/15542; H04B 7/0695
See application file for complete search history.

(56) References Cited

U.S. PATENT DOCUMENTS

| | | | |
|---|---|---|---|
| 2013/0322280 A1* | 12/2013 | Pi | H04W 56/0005 370/252 |
| 2022/0053486 A1* | 2/2022 | Abedini | H04B 7/15542 |
| 2022/0132499 A1* | 4/2022 | Novlan | H04B 7/15542 |
| 2023/0412231 A1* | 12/2023 | Cao | H04B 7/088 |
| 2024/0187075 A1* | 6/2024 | Kuang | H04B 7/0695 |
| 2024/0243797 A1* | 7/2024 | Åström | H04B 7/024 |
| 2024/0244654 A1* | 7/2024 | Kim | H04W 72/0446 |

OTHER PUBLICATIONS

International Search Report and Written Opinion—PCT/US2023/076121—ISA/EPO—Jan. 30, 2024.

* cited by examiner

*Primary Examiner* — Rina C Pancholi
(74) *Attorney, Agent, or Firm* — Harrity & Harrity LLP/Qualcomm Incorporated

(57) ABSTRACT

Various aspects of the present disclosure generally relate to wireless communication. In some aspects, a network node may receive, from a parent network node, an indication of a mapping of time and frequency resources to a set of beams of the network node. The network node may receive one or more communications for forwarding via the set of beams using a set of time and frequency resources. The network node may forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node. Numerous other aspects are described.

43 Claims, 11 Drawing Sheets

MAPPING OF TIME AND FREQUENCY RESOURCES TO BEAMS OF A NETWORK NODE

FIELD OF THE DISCLOSURE

Aspects of the present disclosure generally relate to wireless communication and to techniques and apparatuses for mapping of time and frequency resources to beams of a network node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving, from a parent network node, an indication of a mapping of time and frequency resources to a set of beams of the network node. The method may include receiving, from the parent network node, one or more communications for forwarding via the set of beams using a set of time and frequency resources. The method may include forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

Some aspects described herein relate to a method of wireless communication performed by a parent network node. The method may include transmitting an indication of a mapping of time and frequency resources to a set of beams of a network node. The method may include transmitting, from the parent network node, one or more communications for forwarding via the set of beams using a set of time and frequency resources, the one or more communications being associated with the set of time and frequency resources mapped to one or more beams.

Some aspects described herein relate to a network node for wireless communication. The network node may include a memory and one or more processors coupled to the memory. The one or more processors may be configured to receive, from a parent network node, an indication of a mapping of time and frequency resources to a set of beams of the network node. The one or more processors may be configured to receive, from the parent network node, one or more communications for forwarding via the set of beams using a set of time and frequency resources. The one or more processors may be configured to forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

Some aspects described herein relate to a parent network node for wireless communication. The parent network node may include a memory and one or more processors coupled to the memory. The one or more processors may be configured to transmit an indication of a mapping of time and frequency resources to a set of beams of a network node. The one or more processors may be configured to transmit, from the parent network node, one or more communications for forwarding via the set of beams using a set of time and frequency resources, the one or more communications being associated with the set of time and frequency resources mapped to one or more beams.

Some aspects described herein relate to a non-transitory computer-readable medium that stores a set of instructions for wireless communication by a network node. The set of instructions, when executed by one or more processors of the network node, may cause the network node to receive, from a parent network node, an indication of a mapping of time and frequency resources to a set of beams of the network node. The set of instructions, when executed by one or more processors of the network node, may cause the network node to receive, from the parent network node, one or more communications for forwarding via the set of beams using a set of time and frequency resources. The set of instructions, when executed by one or more processors of the network node, may cause the network node to forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

Some aspects described herein relate to a non-transitory computer-readable medium that stores a set of instructions for wireless communication by a parent network node. The set of instructions, when executed by one or more processors of the parent network node, may cause the parent network node to transmit an indication of a mapping of time and frequency resources to a set of beams of a network node. The set of instructions, when executed by one or more processors of the parent network node, may cause the parent network node to transmit, from the parent network node, one or more communications for forwarding via the set of beams using a set of time and frequency resources, the one or more communications being associated with the set of time and frequency resources mapped to one or more beams.

Some aspects described herein relate to an apparatus for wireless communication. The apparatus may include means for receiving an indication of a mapping of time and frequency resources to a set of beams of the apparatus. The apparatus may include means for receiving, from the parent network node, one or more communications for forwarding via the set of beams using a set of time and frequency resources. The apparatus may include means for forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

Some aspects described herein relate to an apparatus for wireless communication. The apparatus may include means for transmitting an indication of a mapping of time and frequency resources to a set of beams of a network node. The apparatus may include means for transmitting, from the parent network node, one or more communications for forwarding via the set of beams using a set of time and frequency resources, the one or more communications being associated with the set of time and frequency resources mapped to one or more beams.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
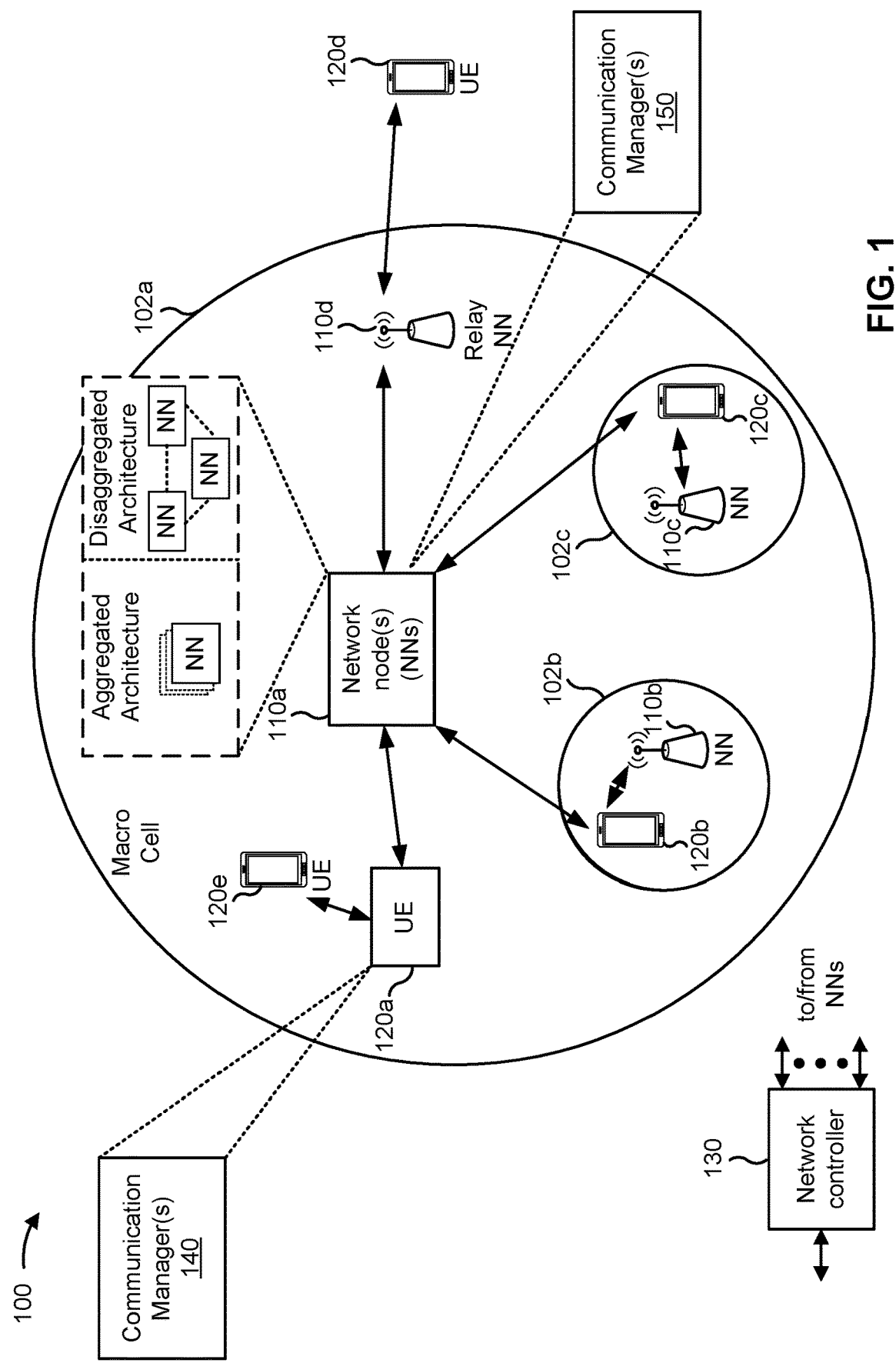
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node"

may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node may include a communication manager 150. As described in more detail elsewhere herein, the communication manager 150 may receive, from a parent network node, an indication of a mapping of time and frequency resources to a set of beams of the network node; receive, from the parent network node, one or more communications for forwarding via the set of beams using a set of time and frequency resources; and forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node. Additionally, or alternatively, the communication manager 150 may perform one or more other operations described herein.

In some aspects, a parent network node may include a communication manager 150. As described in more detail elsewhere herein, the communication manager 150 may transmit an indication of a mapping of time and frequency resources to a set of beams of a network node; and transmit, from the parent network node, one or more communications for forwarding via the set of beams using a set of time and frequency resources, the one or more communications being associated with the set of time and frequency resources mapped to one or more beams. Additionally, or alternatively, the communication manager 150 may perform one or more other operations described herein.

In some aspects, a UE may include a communication manager 140. As described in more detail elsewhere herein, the communication manager 140 may receive an indication of a configuration for mapping time and frequency resources to a beam, the beam providing a connection between the UE and a network node; receive one or more communications via resources within the time and frequency resources mapped to the beam; and enter a low power mode outside of the time and frequency resources mapped to the beam. Additionally, or alternatively, the communication manager 150 may perform one or more other operations described herein.

As indicated above, FIG. 1 is provided as an example. Other examples may differ from what is described with regard to FIG. 1.

Figure 2:
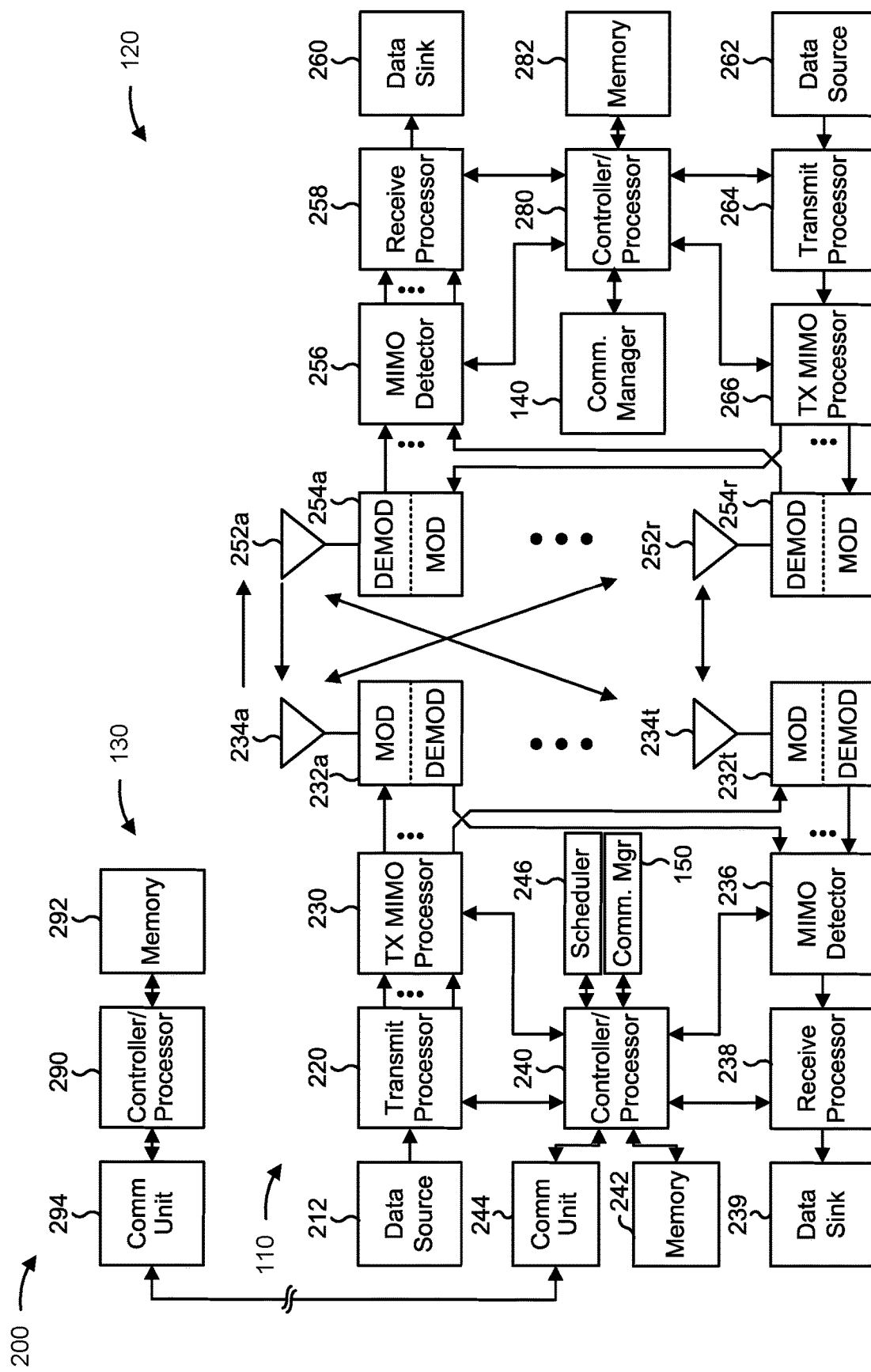
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with mapping of time and frequency resources to beams of a network node, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node includes means for receiving, from a parent network node, an indication of a mapping of time and frequency resources to a set of beams of the network node (e.g., using antenna 234, modem 232, MIMO detector 236, receive processor 238, controller/processor 240, or memory 242, among other examples); means for receiving, from the parent network node, one or more communications for forwarding via the set of beams using a set of time and frequency resources (e.g., using antenna 234, modem 232, MIMO detector 236, receive processor 238, controller/processor 240, or memory 242, among other examples); and/or means for forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node (e.g., using controller/processor 240, transmit processor 220, TX MIMO processor 230, modem 232, antenna 234, or memory 242, among other examples). In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the parent network node includes means for transmitting an indication of a mapping of time and frequency resources to a set of beams of a network node (e.g., using controller/processor 240, transmit processor 220, TX MIMO processor 230, modem 232, antenna 234, or memory 242, among other examples); and/or means for transmitting, from the parent network node, one or more communications for forwarding via the set of beams using a set of time and frequency resources, the one or more communications being associated with the set of time and frequency resources mapped to one or more beams (e.g., using antenna 234, modem 232, MIMO detector 236, receive processor 238, controller/processor 240, or memory 242, among other examples). In some aspects, the means for the parent network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
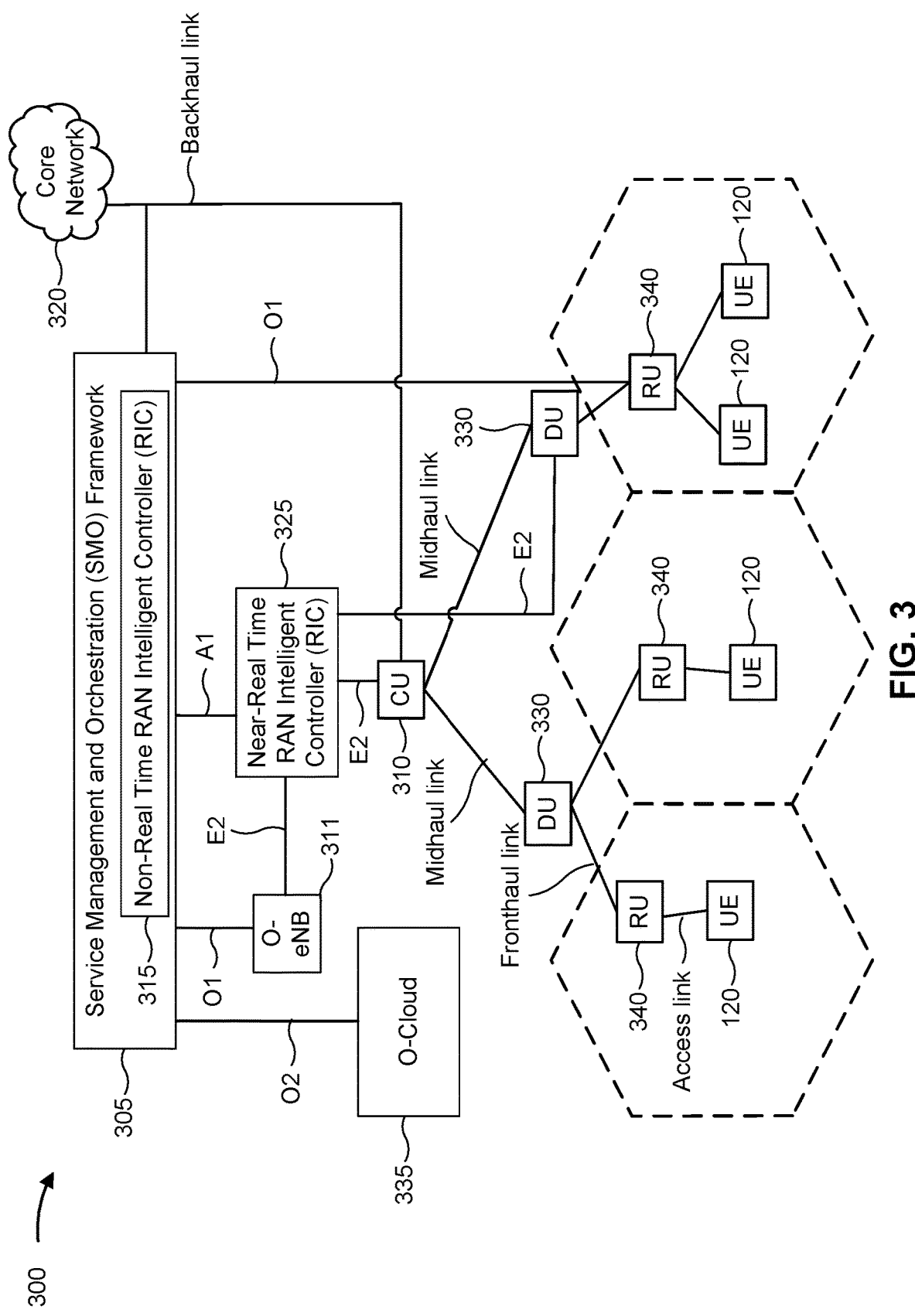
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
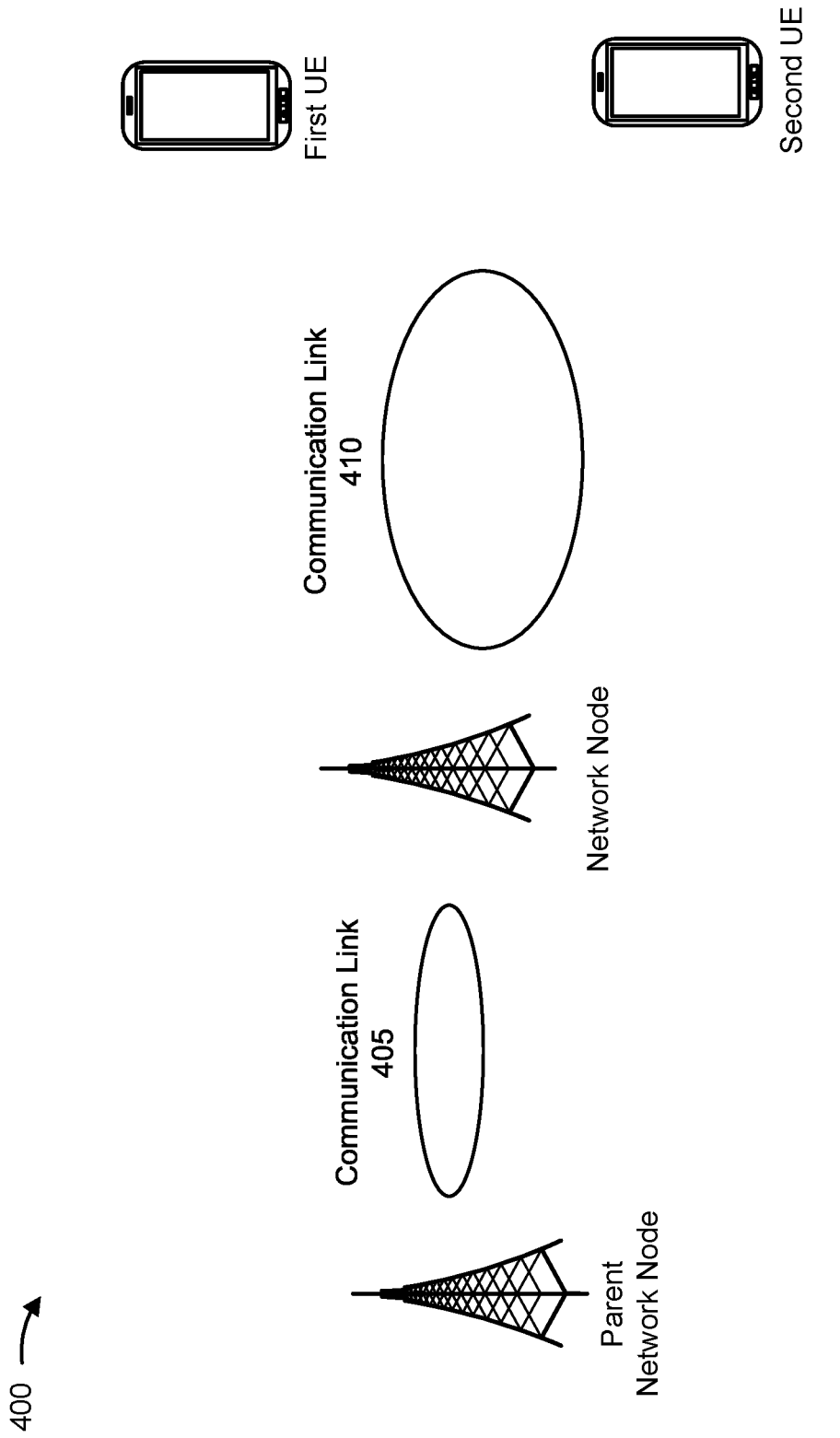
FIG. 4 is a diagram illustrating an example network node that provides a connection between a parent network node and one or more UEs, in accordance with the present disclosure.

FIG. 4 is a diagram illustrating an example 400 network node that provides a connection between a parent network node and one or more UEs, in accordance with the present disclosure.

As shown in FIG. 4, the parent network node and the network node may communicate via a communication link 405. For example, the network node may operate as a repeating node or a forwarding node for the parent network node.

Also shown in FIG. 4, the network node may communicate with a first UE and a second UE via a communication link 410. The network node may use a single omni-directional beam or a single wide-angle beam through which all connected UEs may communicate with the network node (e.g., communicate with the parent network node via the network node).

In some networks (e.g., NR and sub-THz band networks), a Line Of Sight (LOS) channel may be preferred or required for coverage and high throughputs. In some environments, such as an indoor or urban environment, an LOS channel may be unavailable or difficult to determine. For this reason, some network deployments may rely on network nodes to perform functions as repeaters, relays, femto-cells, and/or Reconfigurable Intelligent Surfaces (RISs), among other examples, to penetrate a window or other material, or to bypass an obstacle.

The network node may be required to use low latency relaying such that a UE channel delay spread can pass a cyclic prefix (CP) length (to avoid inter-symbol interference (ISI)), cover a spatial area (e.g., a room), and support communication to multiple UEs, among other examples. For the network node to satisfy network requirements, the repeater may deploy a Transparent Beam Management Procedure (TBMP).

To use the TBMP, the network node may be required to perform no digital processing on the data or on synchronization signal blocks (SSBs) based at least in part on a relaying low latency requirement (e.g., a latency that is lower than the CP length). This may reduce ISI from signals that arrive at the UE in a path that does not include the network node. Based at least in part on the network node performing no digital processing on the data or SSBs and being unaware of a UE associated with the data or SSBs, the network node uses the single omni-directional beam or the single wide-angle beam so the UE can receive the data or SSBs. However, based at least in part on using the single omni-directional beam or the single wide-angle beam, the network node does not achieve a beamforming gain that would be possible with beamforming towards the UE. In this way, the network node and the UE may communicate with an increased error rate and/or with reduced spectral efficiency (e.g., with a reduced MCS, increased repetitions, and/or increased FEC rates, among other examples).

As indicated above, FIG. 4 is provided as an example. Other examples may differ from what is described with regard to FIG. 4.

In some aspects described herein, the parent node may define a UE grouping signaling for beam steering with improved optimization. For example, UEs may be grouped based at least in part on beams through which they connect to the parent network node through the network node. The parent network node may map resources (e.g., time and frequency resources) to a set of beams of the network node. For example, the parent network node may allocate an amount of resources to beams, of the set of beams, based at least in part on a number of UEs connected through the beams and/or an amount of data communicated via the beams. When the parent network node provides a communication to the network node for forwarding, the network node may forward the communication using a beam that is mapped to resources allocated for the communication. In this way, the network node may communicate with UEs using beams with improved beamforming gain and coverage without performing digital processing on the communication to determine a beam to use for forwarding the communication. This may reduce an error rate and/or increase spectral efficiency (e.g., with an increased MCS, reduced repetitions, and/or reduced FEC rates, among other examples) to conserve communication, power, computing, and/or network resources that may have otherwise been used to communicate via an omni-directional beam or a wide-angle beam. Additionally, or alternatively, using the mapping of resources to the set of beams may support improved spatial separation, which may reduce ISI.

In some aspects, the parent network node may provide the mapping of the resources to the set of beams prior to providing the communication for forwarding. In this way, the network node may know in advance to which direction the network node is to steer the communication (e.g., a physical downlink shared channel (PDSCH) and/or SSB) without processing or an associated delay.

In some aspects, the network node may perform transparent beam management (e.g., transparent to a UE) where the UE is not aware of the network node and/or that a beam used to communication with the parent network node is directed to the network node for forwarding. In some aspects, the network node may provide an indication of the mapping to support the UE entering a low-power mode during a time or on a frequency bandwidth that is not allocated to a beam on which the UE communicates with the parent network node and/or the network node.

In some aspects, the network node may report (e.g., to a parent network node) a capability to relay a signal with a very low latency relative to a CP length, to transmit multiple beams simultaneously, and/or a number of beams that the network node may transmit simultaneously (e.g., for frequency division multiplexed beams). Additionally, or alternatively, the network node may indicate a maximum number of beams that the network node can receive and/or transmit based at least in part on, for example hardware limitations and/or coverage limitations (e.g., room size or area size covered by the network node), among other examples. The network node may indicate if the network node supports beam-to-resource mapping (e.g., UE grouping) for PDSCH communications and/or for physical uplink shared channel (PUSCH) communications.

The parent network node may notify the network node of the mapping for SSBs. The parent node may transmit multiple SSBs to the repeater direction for forwarding. SSBs may be relayed to different spatial directions to cover an area of the network node. Once a UE connects to beam of the network node beams (e.g., associated with an SSB), the network node may be configured to transmit and/or receive communications using the beam. For example, if there is only one connected UE the network node may direct communications (e.g., PDSCH and/or PUSCH) only to the connected UE direction via the beam.

If there is more than one connected UE, the parent network node may configure the network node with the mapping. The parent network node may indicate to the network node if frequency separation (e.g., frequency-division multiplexing (FDM)) or time separation (e.g., time-division multiplexing (TDM)) is used between beams of the network node. Additionally, or alternatively, the parent network node may indicate one or more parameters for FDM or TDM, such as a separation a size, and/or a periodicity of each set of time and frequency resources that is allocated to each beam (e.g., associated with each group of UEs connected with each beam). The parent network node may indicate whether the resource-beam mapping is to be used for PDSCH communications and\or PUSCH communications. In some aspects, the parent network node may transmit one or more of these indications via a periodic or a-periodic communication using an RRC communication and/or medium access control (MAC) control element (CE).

In some aspects, the parent network node may notify connected UEs of the mapping (e.g., configured groupings of UEs associated with different resources based at least in part on beams used to connect with the parent network node via the network node) such that the connected UEs may reduce power consumption with reduced open RF (e.g., during a time allocated to a different beam) or reduced bandwidth (e.g., on frequencies allocated to a different beam).

The network node will follow the configuration from the parent network node and relay the parent network node beams to the beams. The parent network node may update a configuration of the mapping (e.g., a change to an amount of resources allocated to each beam) based at least in part on a change to a number of connected UEs, and/or beams used to communicate with the connected UEs, among other examples.

Figure 5:
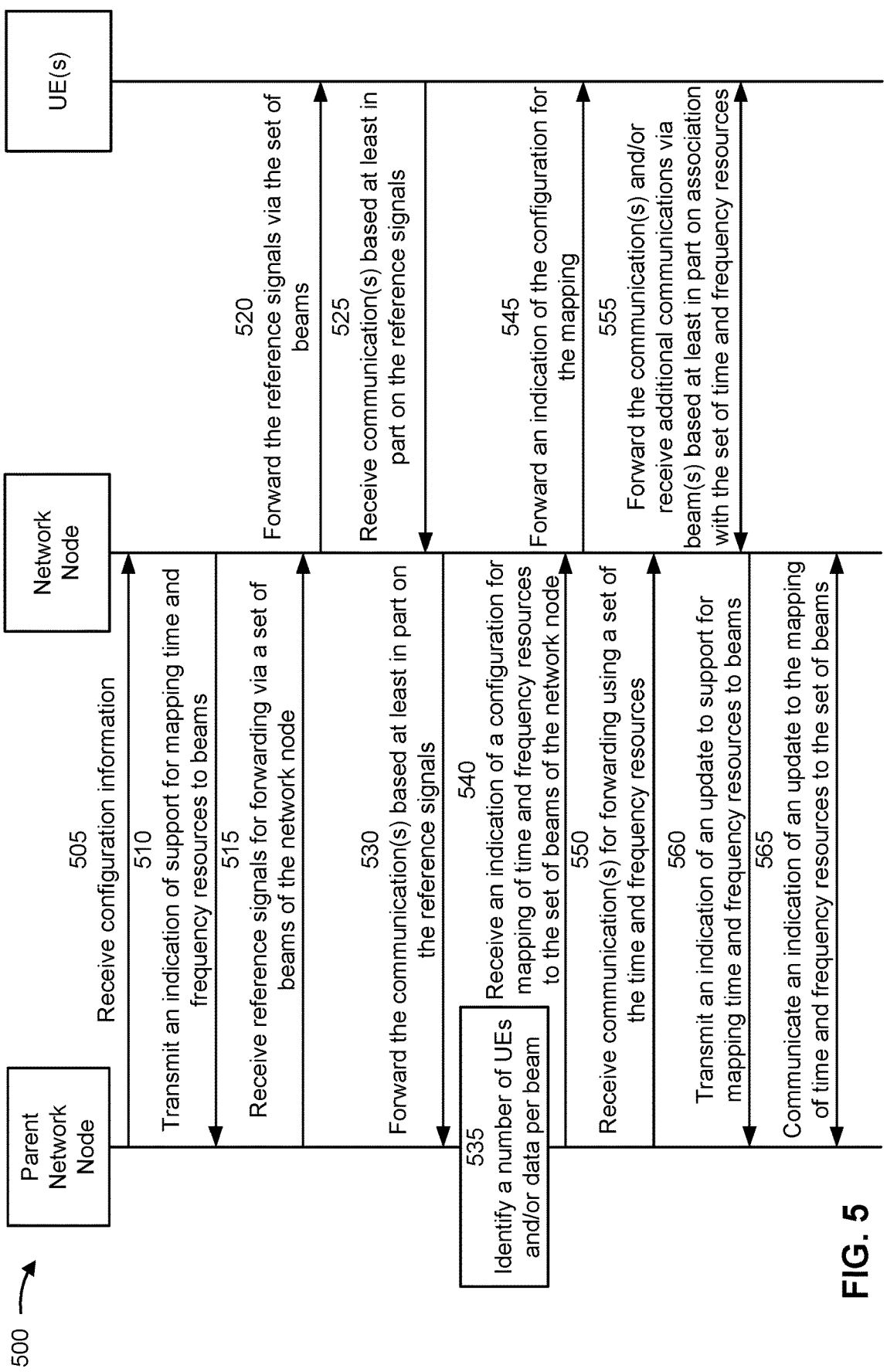
FIG. 5 is a diagram of an example associated with mapping of time and frequency resources to beams of a network node, in accordance with the present disclosure.

FIG. 5 is a diagram of an example 500 associated with mapping of time and frequency resources to beams of a network node, in accordance with the present disclosure. As shown in FIG. 5, a network node (e.g., network node 110, an IAB node, a repeater, a forwarding node, a relay, a DU, and/or an RU) may communicate with a parent network node (e.g., network node 110, an IAB node, a repeater, a forwarding node, a relay, a CU, a DU, and/or an RU) and one or more UEs (e.g., UE 120). In some aspects, the network node, the parent network node, and/or the one or more UEs may be part of a wireless network (e.g., wireless network 100). The network node, the parent network node, and/or the one or more UEs may have established a wireless connection prior to operations shown in FIG. 5.

As shown by reference number 505, the parent network node may transmit, and the network node may receive, configuration information. In some aspects, the network node may receive the configuration information via one or more of RRC signaling, one or more MAC CEs, and/or downlink control information (DCI), among other examples. In some aspects, the configuration information may include an indication of one or more configuration parameters (e.g., already known to the network node and/or previously indicated by the parent network node or other network device) for selection by the network node, and/or explicit configuration information for the network node to use to configure the network node, among other examples.

In some aspects, the configuration information may indicate that the network node is to transmit an indication of support for mapping time and frequency resources to beams. In some aspects, the configuration information may indicate that the network node is to transmit an indication of one or more parameters supported for mapping time and frequency resources to beams. For example, the configuration information may indicate that the network node is to transmit an indication of support for TDM and/or FDM for the mapping.

The network node may configure itself based at least in part on the configuration information. In some aspects, the network node may be configured to perform one or more operations described herein based at least in part on the configuration information.

As shown by reference number 510, the network node may transmit, and the parent network node may receive, an indication of support for mapping time and frequency resources to beams. In some aspects, the indication of support may indicate support for one or more parameters of mapping time and frequency resources to beams. For example, the indication of support may include indications of support for frequency-division multiplexing communications via a first beam and a second beam (e.g., of the set of beams), a maximum number of beams that can be included (e.g., supported for inclusion) in the set of beams, mapping of time and frequency resources to the set of beams of the network node for downlink communications (e.g., the indication of support may indicate a capability of the network node to map specific resources to different beams, e.g., a capability of the network node to map communications received over a first set of resources to a first beam such that the network node forwards said communications via the first beam while mapping communications received over a second set of resources to a second beam, etc.), and/or mapping of time and frequency resources to the set of beams of the network node for uplink communications, among other examples.

In some aspects, the network node may indicate support for mapping communications received (e.g., for forwarding) over a first set of resources to forwarding via a first beam and mapping communications received (e.g., for forwarding) over a second set of resources for forwarding via a second beam.

As shown by reference number 515, the network node may receive, and the parent network node may transmit, reference signals for forwarding via a set of beams of the network node. In some aspects, the reference signals may include SSBs and/or channel state information reference signals (CSI-RSs). The reference signals may be associated with establishing a connection with the parent network node via the network node and/or beam management (e.g., beam selection and/or reselection), among other examples.

As shown by reference number 520, the network node may forward, to one or more UEs, the reference signals via the set of beams. In some aspects, the network node may forward the reference signals without digital processing, deep packet inspection, or other processes for detecting, within a packet carrying the reference signals, an indication of beams associated with the reference signals.

As shown by reference number 525, the network node may receive, and the one or more UEs may transmit, one or more communications based at least in part on the reference signals. For example, the network node may receive one or more random access channel communications and/or measurement reports associated with the reference signals. The reference signals may include SSBs and/or CSI-RSs, among other examples.

As shown by reference number 530, the network node may forward, and the parent network node may receive, the one or more communications that are based at least in part on the reference signals. In some aspects, the one or more communications may indicate (e.g., with an SSB identification) an SSB having a highest signal strength as measured by a UE. The parent network node may determine that the UE is in a location associated with communicating with the parent network node via a beam associated with the SSB.

The network node may provide a connection between the parent network node and the one or more UEs via one or more beams of the set of beams based at least in part on the reference signals. For example, the UE may communicate with data, reference signals, and/or feedback between the parent network node and the one or more UEs via the one or more beams that cover locations of the one or more UEs.

As shown by reference number 535, the parent network node may identify the number of UEs and/or data per beam. In some aspects, the parent network node may determine a number of UEs and/or data per beam based at least in part on the communications that are based at least in part on the reference signals. In some aspects, the parent network node may allocate a portion of resources (time and frequency resources) based at least in part on the number of UEs and/or data on respective beams. For example, if two UEs are connected via a first beam and one UE is connected via a second beam, the parent network node may allocate more resources to the first beam than to the second beam (e.g., ⅔ of resources allocated to the first beam and ⅓ allocated to the second beam).

In some aspects, a beam of the set of beams has no connected UEs. The parent network node may not allocate time and frequency resources for forwarding communications via the beam.

In some aspects, a first subset of the set of time and frequency resources associated with a first beam is time-division multiplexed with a second subset of the set of time and frequency resources associated with a second beam. For example, resources within a first period of time are mapped to a first beam and resources within a second period of time are mapped to a second beam. The first period of time and the second period of time may alternate and/or may repeat. In some aspects, the first subset of the set of time and frequency resources associated with the first beam is frequency-division multiplexed with the second subset of the set of time and frequency resources associated with the second beam. For example, resources within a first bandwidth (e.g., frequency unit, bandwidth part, and/or another type of frequency resources) are mapped to a first beam and resources within a second bandwidth are mapped to a second beam.

As shown by reference number 540, the network node may receive, and the parent network node may transmit, an indication of a configuration for mapping of time and frequency resources to the set of beams of the network node. For example, the network node may receive an indication of the mapping of time and frequency resources to the set of beams of the network. In some aspects, the mapping may allocate different amounts of resources to different beams of the set of beams. For example, a beam on which the network node has no connected UEs (e.g., as determined based at least in part on the communications received based at least in part on the reference signals) may have no resources allocated for data communications and/or may still have resources allocated for subsequent reference signals (e.g., SSBs).

In some aspects, the configuration for mapping the time and frequency resources to the set of beams may indicate parameters such as whether to use one or more of TDM of the one or more beams or FDM of the one or more beams, whether to use the mapping of time and frequency resources to the set of beams of the network node for an uplink data channel, and/or whether to use the mapping of time and frequency resources to the set of beams of the network node for a downlink data channel, among other examples. Additionally, or alternatively, the parameters may include a time gap for TDM of the one or more beams, and/or a frequency gap for FDM of the one or more beams, among other examples.

As shown by reference number 545, the network node may transmit, and a UE may receive, an indication of the configuration for the mapping. In some aspects, the network node may forward an indication of a schedule of a subset of the set of time and frequency resources mapped to a beam through which the UE connects to the network node and the parent network node. The UE may reduce power consumption with reduced open RF or reduced bandwidth based at least in part on the schedule of the subset of time and frequency resources mapped to the beam.

As shown by reference number 550, the network node may receive, and the parent network node may transmit, one or more communications for forwarding using a set of time and frequency resources. In some aspects, the network node may receive one or more communications for forwarding via the set of beams using a set of time and frequency resources.

As shown by reference number 555, the network node may forward the one or more communications and/or receive additional communications via one or more beams based at least in part on an association with the set of time and frequency resources. In some aspects, the network node may forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

In some aspects, a set of the one or more communications includes a first communication directed to a first UE via a beam of the one or more beams and a second communication directed to a second UE via the beam of the one or more beams. In some aspects, forwarding the one or more communications via the one or more beams of the set of beams includes forwarding the first communication via a first subset of the set of time and frequency resources and forwarding the second communication via a second subset of the set of time and frequency resources, with the first subset being associated with the beam the second subset being associated with the beam and being different from the first subset.

In some aspects, the network node may receive, via the one or more beams, a set of uplink communications via time and frequency resources mapped to the one or more beams. For example, the configuration for the mapping of time and frequency resources to the set of beams of the network node may indicate a mapping of time and frequency resources for an uplink communication and/or a downlink communication. In this way, the network node may use a reception beam to receive communications from UEs at times and/or frequencies allocated to the reception beam.

As shown by reference number 560, the network node may transmit, and the parent network node may receive, an indication of an update to support for mapping time and frequency resources to beams.

As shown by reference number 565, the network node and the parent network node may communicate an indication of an update to the mapping of time and frequency resources to the set of beams. In some aspects, the parent network node may transmit the indication of the update to the mapping. In some aspects, the network node may transmit an indication of an update associated with the mapping. For example, the network node may time domain an indication of an update to the number of beams supported for the set of beams, support for mapping of time and frequency resources to the set of beams of the network node for downlink communications, or support for mapping of time and frequency resources to the set of beams of the network node for uplink communications, among other examples.

In some aspects, the update to the mapping of time and frequency resources is based at least in part on amounts of data communicated via respective beams or a number of UEs connected via the respective beams. For example, the update may be based at least in part on one or more UEs moving from one beam to another beam of the network node or one or more UEs moving outside of coverage of the network node.

Based at least in part on mapping resources to beams of the network node, the network node may communicate with UEs using beams with improved beamforming gain and coverage without performing digital processing on the communication to determine a beam to use for forwarding the communication. This may reduce an error rate and/or increase spectral efficiency (e.g., with an increased MCS, reduced repetitions, and/or reduced FEC rates, among other examples) to conserve communication, power, computing, and/or network resources that may have otherwise been used to communicate via an omni-directional beam or a wide-angle beam. Additionally, or alternatively, using the mapping of resources to the set of beams may support improved spatial separation, which may reduce ISI.

As indicated above, FIG. 5 is provided as an example. Other examples may differ from what is described with respect to FIG. 5.

Figure 6:
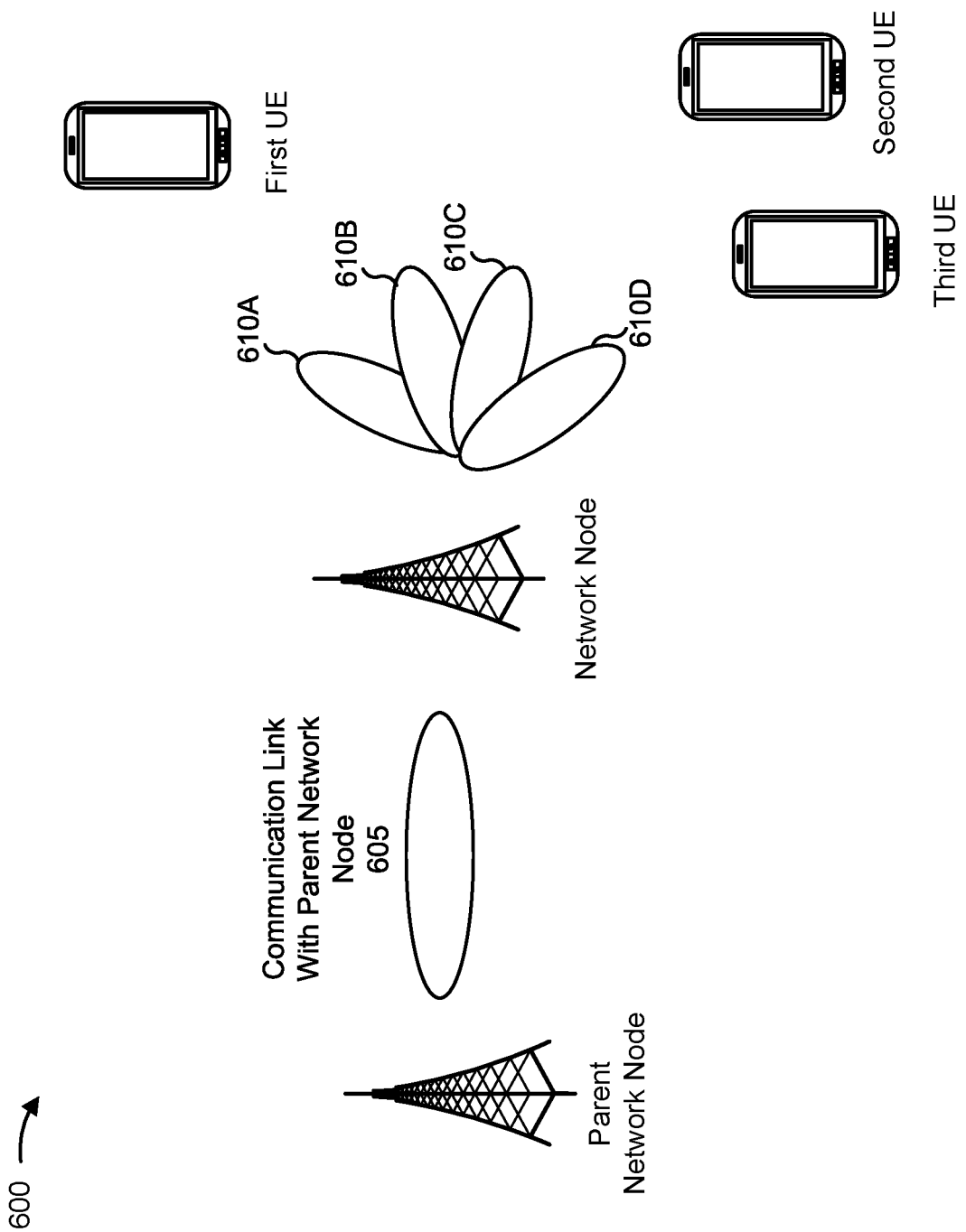
FIG. 6 is a diagram of example associated with mapping of time and frequency resources to beams of a network node, in accordance with the present disclosure.

FIG. 6 is a diagram of example 600 associated with mapping of time and frequency resources to beams of a network node, in accordance with the present disclosure. As shown in FIG. 6, a network node (e.g., network node 110, an IAB node, a repeater, a forwarding node, a relay, a DU, and/or an RU) may communicate with a parent network node (e.g., network node 110, an IAB node, a repeater, a forwarding node, a relay, a CU, a DU, and/or an RU), and one or more UEs (e.g., UE 120). In some aspects, the network node, the parent network node, and/or the one or more UEs may be part of a wireless network (e.g., wireless network 100). The network node, the parent network node, and/or the one or more UEs may have established a wireless connection prior to operations shown in FIG. 6.

As shown in FIG. 6, the parent network node and the network node may communicate via a communication link 605. In some aspects, the network node may operate as a repeating node or a forwarding node for the parent network node.

Also shown in FIG. 6, the network node may communicate with a first UE via a communication link associated with beam 610A. The network node may have no connected UEs using beams 610B or 610C. The network node may communicate with a second UE and a third UE via a beam 610D.

In some aspects, the network node may indicate to the parent network node that one UE is connected via beam 610A, that two UEs are connected via beam 610 D, and that no UEs are connected via the beams 610B or 610C. In some aspects, the network node may provide the indication based at least in part on forwarding measurements of the beams 610A-610D from the UEs. In this way, the parent network node may determine that a beam associated with a first reference signal (e.g., beam 610A) should be allocated time and frequency resources for communicating a data channel with the first UE and that a beam associated with a second reference signal (e.g., beam 610D) should be allocated time and frequency resources for communicating data channels with the second UE and the third UE.

In some aspects, the parent network node may determine an amount of resources to allocate per beam based at least in part on a number of connected UEs per beam and/or an amount of data communicated per beam. Additionally, or alternatively, the parent network node may determine an amount of resources to allocate based at least in part on types of data communicated per beam. In some aspects, the parent network node may determine a type of mapping (e.g., TDM-based or FDM-based) based at least in part on a type of data communicated per beam. For example, if the first UE is receiving a data stream, the parent network node may use FDM to provide mapped resources of the beam 610A without a limitation on time. In some aspects, the type of mapping based at least in part on a capability of the network node.

As indicated above, FIG. 6 is provided as an example. Other examples may differ from what is described with respect to FIG. 6.

Figure 7:
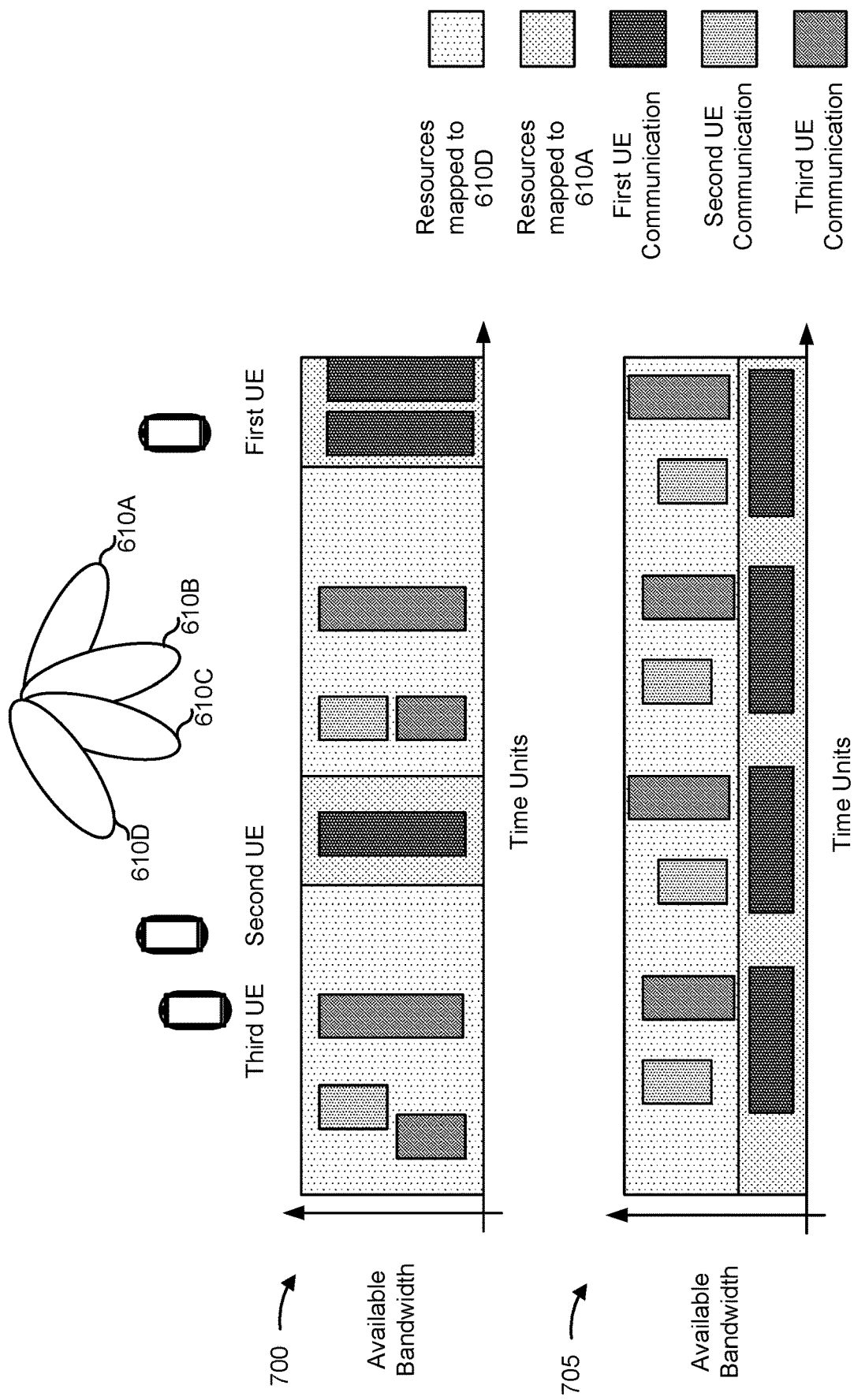
FIG. 7 is a diagram of examples associated with mapping of time and frequency resources to beams of a network node, in accordance with the present disclosure.

FIG. 7 is a diagram of examples 700 and 705 associated with mapping of time and frequency resources to beams of a network node, in accordance with the present disclosure. As shown in FIG. 7, a network node (e.g., network node 110, an IAB node, a repeater, a forwarding node, a relay, a DU, and/or an RU) may communicate with a parent network node (e.g., network node 110, an IAB node, a repeater, a forwarding node, a relay, a CU, a DU, and/or an RU), and one or more UEs (e.g., UE 120). In some aspects, the network node, the parent network node, and/or the one or more UEs may be part of a wireless network (e.g., wireless network 100). The network node, the parent network node, and/or the one or more UEs may have established a wireless connection prior to operations shown in FIG. 7.

As shown by example 700, the parent network node may map resources to the beam 610D and to the beam 610A based at least in part on the beams 610D and 610A having connected UEs. In a first time period, the parent network node may allocate resources to two second UE communications (e.g., communications with the first UE) and one third UE communication. In some aspects, some of the resources mapped to the beam 610D and to the beam 610A may not be allocated to a communication. In a second time period, the parent network node may allocate resources to a first UE communication.

The first time period and the second time period may repeatedly alternate for a period of time or for a number of repetitions. In this way, the network node may forward communications via only one beam at a time.

As shown by example 705, the parent network node may map resources to the beam 610D and to the beam 610A based at least in part on the beams 610D and 610A having connected UEs. The parent network node may allocate a first portion of an available bandwidth as resources mapped to beam 610A and a second portion of the available bandwidth as resources mapped to 610D. In some aspects, some of the resources mapped to the beam 610D and to the beam 610A may not be allocated to a communication. In this way, the network node may forward communications via multiple beams at a same time. This may be configured based at least in part on a capability of the network node to simultaneously transmit via different beams.

As indicated above, FIG. 7 is provided as an example. Other examples may differ from what is described with respect to FIG. 7.

Figure 8:
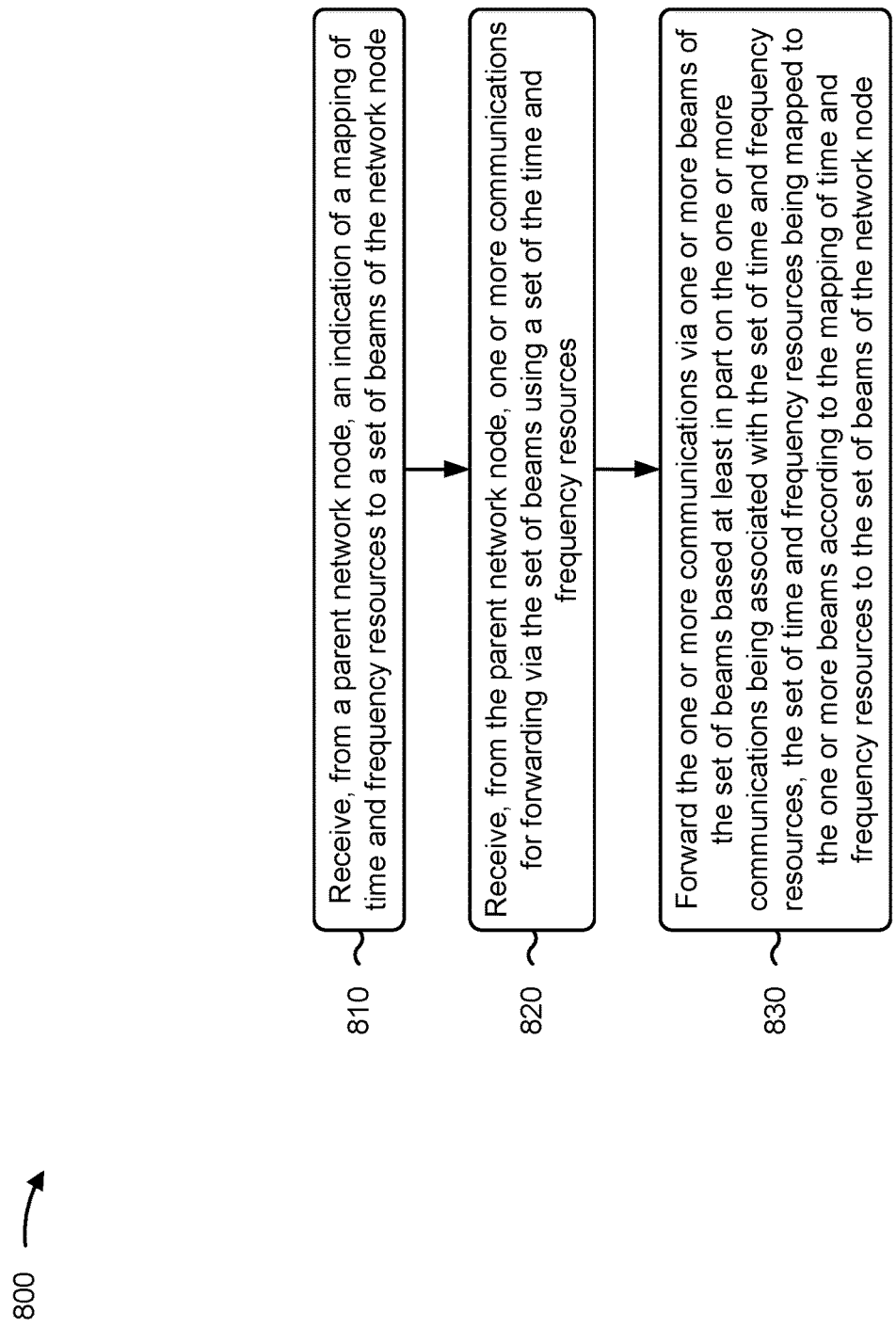
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with mapping of time and frequency resources.

As shown in FIG. 8, in some aspects, process 800 may include receiving (e.g., from a parent network node) an indication of a mapping of time and frequency resources to a set of beams of the network node (block 810). For example, the network node (e.g., using communication manager 150 and/or reception component 1002, depicted in FIG. 10) may receive (e.g., from a parent network node) an indication of a mapping of time and frequency resources to a set of beams of the network node, as described above.

As further shown in FIG. 8, in some aspects, process 800 may include receiving (e.g., from the parent network node) one or more communications for forwarding via the set of beams using a set of time and frequency resources (block 820). For example, the network node (e.g., using communication manager 150 and/or reception component 1002, depicted in FIG. 10) may receive (e.g., from the parent network node) one or more communications for forwarding via the set of beams using a set of time and frequency resources, as described above.

As further shown in FIG. 8, in some aspects, process 800 may include forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node (block 830). For example, the network node (e.g., using communication manager 150 and/or communication manager 1008, depicted in FIG. 10) may forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node, as described above.

Process 800 may include additional aspects, such as any single aspect or any combination of aspects described below and/or in connection with one or more other processes described elsewhere herein.

In a first aspect, an amount of time and frequency resources allocated to respective beams of the set of beams is based at least in part on one or more of an amount of data communicated via the respective beams, or a number of UEs connected via the respective beams.

In a second aspect, alone or in combination with the first aspect, process 800 includes receiving (e.g., from the parent network node) an indication of an update to the mapping of time and frequency resources to the set of beams of the network node.

In a third aspect, alone or in combination with one or more of the first and second aspects, the update to the mapping of time and frequency resources to the set of beams of the network node is based at least in part on amounts of data communicated via respective beams, or a number of UEs connected via the respective beams.

In a fourth aspect, alone or in combination with one or more of the first through third aspects, a set of the one or more communications includes a first communication directed to a first UE via a beam of the one or more beams and a second communication directed to a second UE via the beam of the one or more beams, and wherein the forwarding the one or more communications via the one or more beams of the set of beams comprises forwarding the first communication via a first subset of the set of time and frequency resources, the first subset associated with the beam, and forwarding the second communication via a second subset of the set of time and frequency resources, the second subset associated with the beam and being different from the first subset.

In a fifth aspect, alone or in combination with one or more of the first through fourth aspects, a beam of the set of beams has no connected UEs, and wherein the beam is not allocated time and frequency resources for forwarding communications.

In a sixth aspect, alone or in combination with one or more of the first through fifth aspects, a first subset of the set of time and frequency resources associated with a first beam is time-division multiplexed with a second subset of the set of time and frequency resources associated with a second beam, or wherein the first subset of the set of time and frequency resources associated with the first beam is frequency-division multiplexed with the second subset of the set of time and frequency resources associated with the second beam.

In a seventh aspect, alone or in combination with one or more of the first through sixth aspects, process 800 includes transmitting, to the parent network node, an indication of support for one or more of frequency-division multiplexing communications via a first beam and a second beam (e.g., of the set of beams), a number of beams that can be included in the set of beams, mapping of time and frequency resources to the set of beams of the network node for downlink communications, or mapping of time and frequency resources to the set of beams of the network node for uplink communications.

In an eighth aspect, alone or in combination with one or more of the first through seventh aspects, process 800 includes transmitting, from the parent network node, an indication of an update to one or more of the number of beams supported for the set of beams, support for mapping of time and frequency resources to the set of beams of the network node for downlink communications, or support for mapping of time and frequency resources to the set of beams of the network node for uplink communications.

In a ninth aspect, alone or in combination with one or more of the first through eighth aspects, process 800 includes receiving reference signals for forwarding, and forwarding the reference signals via the set of beams.

In a tenth aspect, alone or in combination with one or more of the first through ninth aspects, process 800 includes providing a connection between the parent network node and one or more UEs via the one or more beams of the set of beams based at least in part on the reference signals.

In an eleventh aspect, alone or in combination with one or more of the first through tenth aspects, process 800 includes receiving, from the parent network node, an indication of one or more parameters for the mapping of time and frequency resources to the set of beams of the network node, and wherein the network node provides connections between the parent network node and a first UE and between the parent network node and a second UE.

In a twelfth aspect, alone or in combination with one or more of the first through eleventh aspects, the one or more parameters for the mapping of time and frequency resources to the set of beams of the network node comprise one or more of whether to use one or more of time-division multiplexing of the one or more beams or frequency-division multiplexing of the one or more beams, a time gap for time division multiplexing of the one or more beams, a frequency gap for frequency division multiplexing of the one or more beams, whether to use the mapping of time and frequency resources to the set of beams of the network node for an uplink data channel, or whether to use the mapping of time and frequency resources to the set of beams of the network node for a downlink data channel.

In a thirteenth aspect, alone or in combination with one or more of the first through twelfth aspects, process 800 includes receiving, from the parent network node, an indication of a schedule of a subset of the set of time and frequency resources mapped to a beam, and forwarding, via the beam, the indication to a UE connected to the parent network node via the beam.

In a fourteenth aspect, alone or in combination with one or more of the first through thirteenth aspects, process 800 includes receiving, via the one or more beams, a set of uplink communications via time and frequency resources mapped to the one or more beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
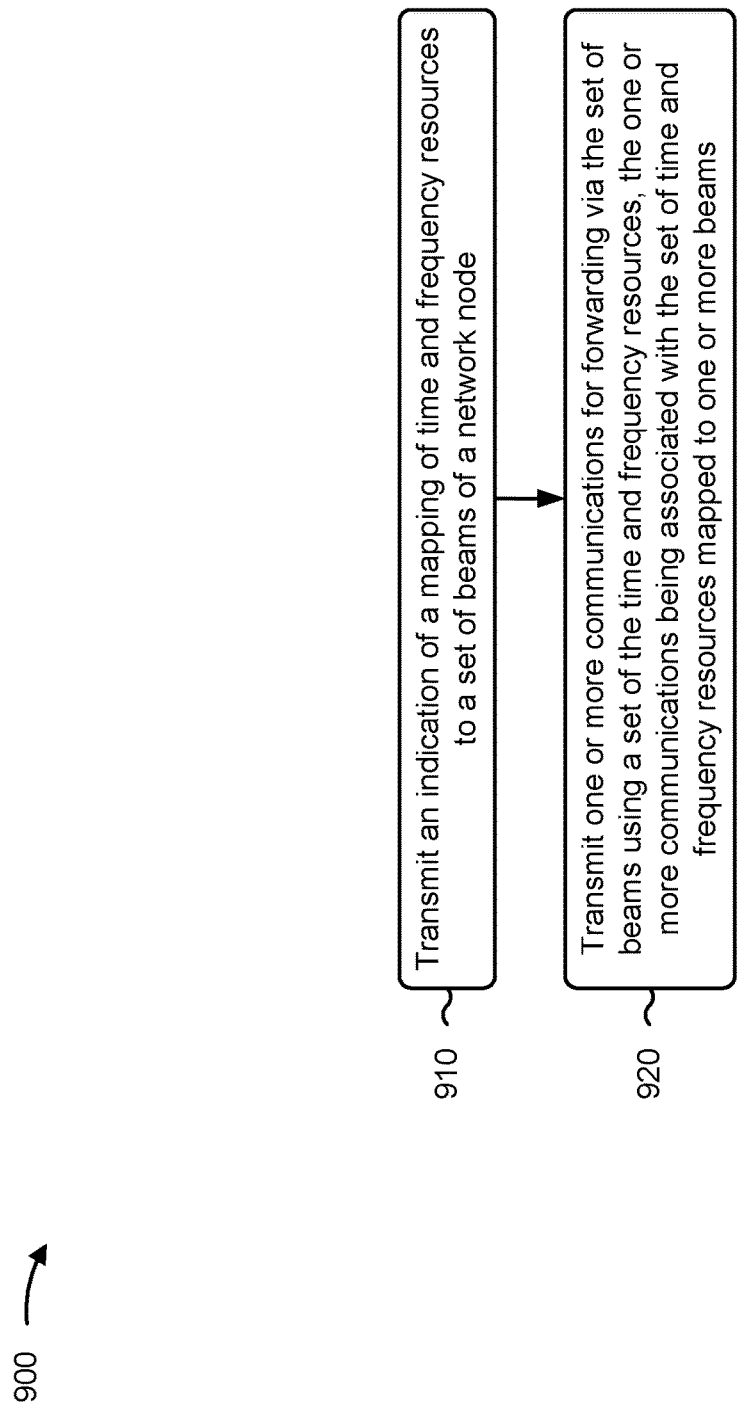
FIG. 9 is a diagram illustrating an example process performed, for example, by a parent network node, in accordance with the present disclosure.

FIG. 9 is a diagram illustrating an example process 900 performed, for example, by a parent network node, in accordance with the present disclosure. Example process 900 is an example where the parent network node (e.g., parent network node 110) performs operations associated with mapping of time and frequency resources.

As shown in FIG. 9, in some aspects, process 900 may include transmitting an indication of a mapping of time and frequency resources to a set of beams of a network node (block 910). For example, the parent network node (e.g., using communication manager 150 and/or transmission component 1104, depicted in FIG. 11) may transmit an indication of a mapping of time and frequency resources to a set of beams of a network node, as described above.

As further shown in FIG. 9, in some aspects, process 900 may include transmitting one or more communications for forwarding via the set of beams using a set of time and frequency resources, the one or more communications being associated with the set of time and frequency resources mapped to one or more beams (block 920). For example, the parent network node (e.g., using communication manager 150 and/or transmission component 1104, depicted in FIG. 11) may transmit one or more communications for forwarding via the set of beams using a set of time and frequency resources, the one or more communications being associated with the set of time and frequency resources mapped to one or more beams, as described above.

Process 900 may include additional aspects, such as any single aspect or any combination of aspects described below and/or in connection with one or more other processes described elsewhere herein.

In a first aspect, an amount of time and frequency resources allocated to respective beams of the set of beams is based at least in part on one or more of an amount of data communicated via the respective beams, or a number of UEs connected via the respective beams.

In a second aspect, alone or in combination with the first aspect, process 900 includes transmitting an indication of an update to the mapping of time and frequency resources to the set of beams of the network node.

In a third aspect, alone or in combination with one or more of the first and second aspects, the update to the mapping of time and frequency resources to the set of beams of the network node is based at least in part on amounts of data communicated via respective beams, or a number of UEs connected via the respective beams.

In a fourth aspect, alone or in combination with one or more of the first through third aspects, a set of the one or more communications includes a first communication directed to a first UE via a beam of the one or more beams and a second communication directed to a second UE via the beam of the one or more beams, wherein the first communication is associated with a first subset of the set of time and frequency resources, the first subset associated with the beam, and wherein the second communication is associated with a second subset of the set of time and frequency resources, the second subset associated with the beam and being different from the first sub set.

In a fifth aspect, alone or in combination with one or more of the first through fourth aspects, a beam of the set of beams has no connected UEs, and wherein the beam is not allocated time and frequency resources for forwarding communications.

In a sixth aspect, alone or in combination with one or more of the first through fifth aspects, a first subset of the set of time and frequency resources associated with a first beam is time-division multiplexed with a second subset of the set of time and frequency resources associated with a second beam, or wherein the first subset of the set of time and frequency resources associated with the first beam is frequency-division multiplexed with the second subset of the set of time and frequency resources associated with the second beam.

In a seventh aspect, alone or in combination with one or more of the first through sixth aspects, process 900 includes receiving, to the parent network node, an indication of support for one or more of frequency-division multiplexing communications via a first beam and a second beam (e.g., of the set of beams), a number of beams that can be included in the set of beams, mapping of time and frequency resources to the set of beams of the network node for downlink communications, or mapping of time and frequency resources to the set of beams of the network node for uplink communications.

In an eighth aspect, alone or in combination with one or more of the first through seventh aspects, process 900 includes receiving, from the parent network node, an indication of an update to one or more of the number of beams supported for the set of beams, support for mapping of time and frequency resources to the set of beams of the network node for downlink communications, or support for mapping of time and frequency resources to the set of beams of the network node for uplink communications.

In a ninth aspect, alone or in combination with one or more of the first through eighth aspects, process 900 includes transmitting reference signals for forwarding via the set of beams.

In a tenth aspect, alone or in combination with one or more of the first through ninth aspects, process 900 includes establishing, via one or more beams of the set of beams, a connection with one or more UEs via the network node based at least in part on the reference signals.

In an eleventh aspect, alone or in combination with one or more of the first through tenth aspects, process 900 includes transmitting an indication of one or more parameters for the mapping of time and frequency resources to the set of beams of the network node, and wherein the network node provides connections between the parent network node and a first UE and between the parent network node and a second UE.

In a twelfth aspect, alone or in combination with one or more of the first through eleventh aspects, the one or more parameters for the mapping of time and frequency resources to the set of beams of the network node comprise one or more of whether to use one or more of time-division multiplexing of the one or more beams or frequency-division multiplexing of the one or more beams, a time gap for time division multiplexing of the one or more beams, a frequency gap for frequency division multiplexing of the one or more beams, whether to use the mapping of time and frequency resources to the set of beams of the network node for an uplink data channel, or whether to use the mapping of time and frequency resources to the set of beams of the network node for a downlink data channel.

In a thirteenth aspect, alone or in combination with one or more of the first through twelfth aspects, process 900 includes providing, to a UE connected to the parent network node via a beam of the network node, an indication of a schedule of a subset of the set of time and frequency resources mapped to a beam.

In a fourteenth aspect, alone or in combination with one or more of the first through thirteenth aspects, process 900 includes receiving, via the network node, a set of uplink communications, wherein resources allocated to the set of uplink communications are mapped to the set of beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
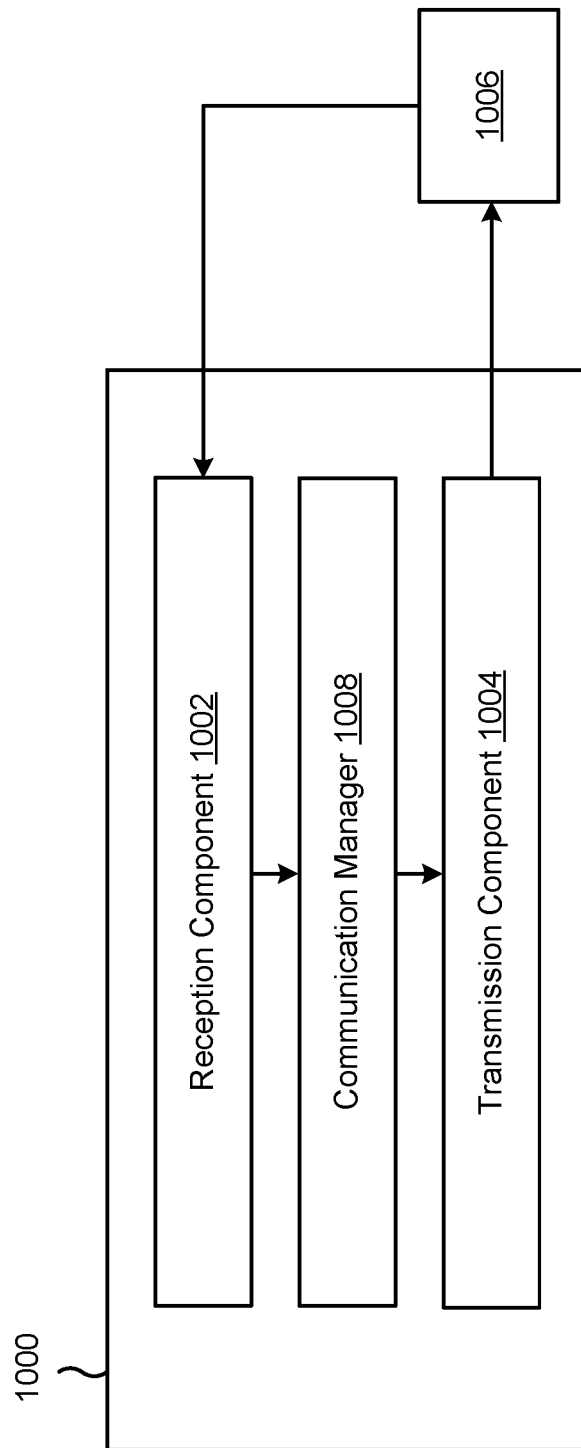
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive (e.g., from a parent network node) an indication of a mapping of time and frequency resources to a set of beams of the network node. The reception component 1002 may receive (e.g., from the parent network node) one or more communications for forwarding via the set of beams using a set of time and frequency resources. The transmission component 1004 may forward the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

The reception component 1002 may receive (e.g., from the parent network node) an indication of an update to the mapping of time and frequency resources to the set of beams of the network node.

The transmission component 1004 may transmit, to the parent network node, an indication of support for one or more of frequency-division multiplexing communications via a first beam and a second beam (e.g., of the set of beams), a number of beams that can be included in the set of beams, mapping of time and frequency resources to the set of beams of the network node for downlink communications, or mapping of time and frequency resources to the set of beams of the network node for uplink communications.

The transmission component 1004 may transmit an indication of an update to one or more of the number of beams supported for the set of beams, support for mapping of time and frequency resources to the set of beams of the network node for downlink communications, or support for mapping of time and frequency resources to the set of beams of the network node for uplink communications.

The reception component 1002 may receive reference signals for forwarding.

The transmission component 1004 may forward the reference signals via the set of beams.

The transmission component 1004 may provide a connection between the parent network node and one or more UEs via the one or more beams of the set of beams based at least in part on the reference signals.

The reception component 1002 may receive, from the parent network node, an indication of one or more parameters for the mapping of time and frequency resources to the set of beams of the network node.

The reception component 1002 may receive, from the parent network node, an indication of a schedule of a subset of the set of time and frequency resources mapped to a beam.

The transmission component 1004 may forward, via the beam, the indication to a UE connected to the parent network node via the beam.

The reception component 1002 may receive, via the one or more beams, a set of uplink communications via time and frequency resources mapped to the one or more beams.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
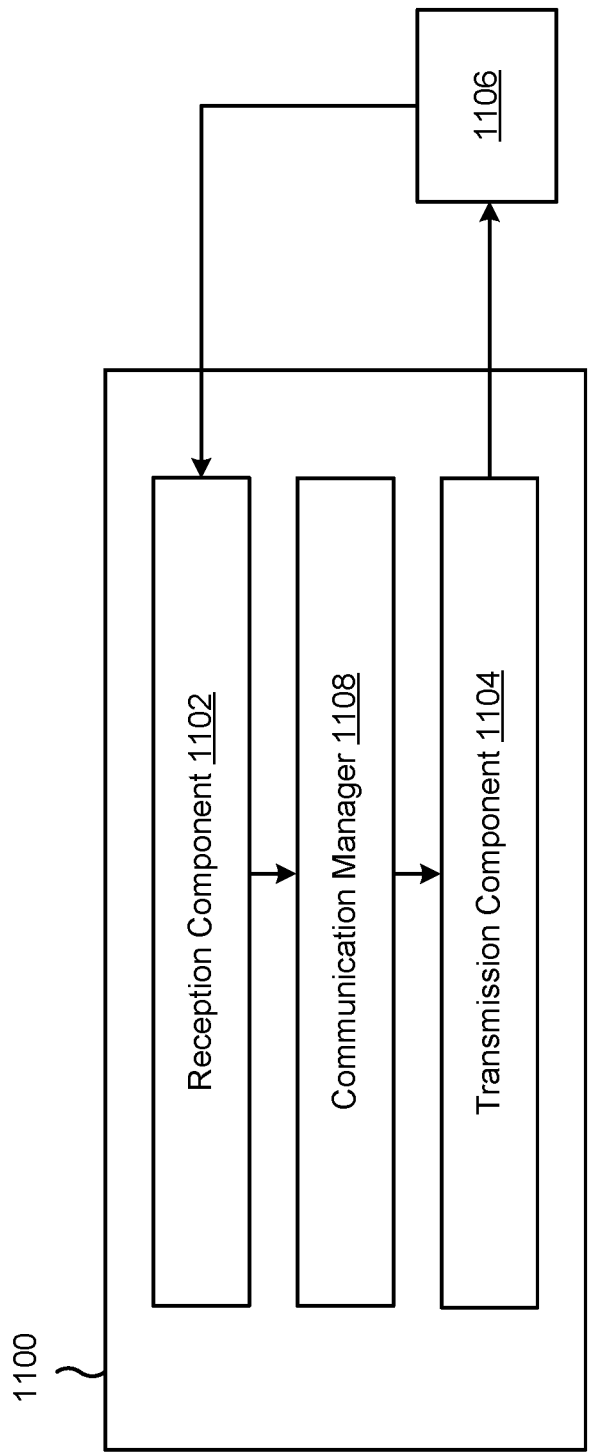
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a parent network node, or a parent network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., the communication manager 150).

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the parent network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the parent network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the parent network node described in connection with FIG. 2. In some aspects, the transmission component 1104 may be co-located with the reception component 1102 in a transceiver.

The transmission component 1104 may transmit an indication of a mapping of time and frequency resources to a set of beams of a network node. The transmission component 1104 may transmit one or more communications for forwarding via the set of beams using a set of time and frequency resources, the one or more communications being associated with the set of time and frequency resources mapped to one or more beams.

The transmission component 1104 may transmit an indication of an update to the mapping of time and frequency resources to the set of beams of the network node.

The reception component 1102 may receive an indication of support for one or more of frequency-division multiplexing communications via a first beam and a second beam (e.g., of the set of beams), a number of beams that can be included in the set of beams, mapping of time and frequency resources to the set of beams of the network node for downlink communications, or mapping of time and frequency resources to the set of beams of the network node for uplink communications.

The reception component 1102 may receive, from the parent network node, an indication of an update to one or more of the number of beams supported for the set of beams, support for mapping of time and frequency resources to the set of beams of the network node for downlink communications, or support for mapping of time and frequency resources to the set of beams of the network node for uplink communications.

The transmission component 1104 may transmit reference signals for forwarding via the set of beams.

The communication manager 1108 may establish, via one or more beams of the set of beams, a connection with one or more UEs via the network node based at least in part on the reference signals.

The transmission component 1104 may transmit an indication of one or more parameters for the mapping of time and frequency resources to the set of beams of the network node.

The transmission component 1104 may provide, to a UE connected to the parent network node via a beam of the network node, an indication of a schedule of a subset of the set of time and frequency resources mapped to a beam.

The reception component 1102 may receive, via the network node, a set of uplink communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving, from a parent network node, an indication of a mapping of time and frequency resources to a set of beams of the network node; receiving, from the parent network node, one or more communications for forwarding via the set of beams using a set of time and frequency resources; and forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams of the network node.

Aspect 2: The method of Aspect 1, wherein an amount of time and frequency resources allocated to respective beams of the set of beams is based at least in part on one or more of: an amount of data communicated via the respective beams, or a number of user equipments (UEs) connected via the respective beams.

Aspect 3: The method of any of Aspects 1-2, further comprising: receiving an indication of an update to the mapping of time and frequency resources to the set of beams of the network node.

Aspect 4: The method of Aspect 3, wherein the update to the mapping of time and frequency resources to the set of beams of the network node is based at least in part on: amounts of data communicated via respective beams, or a number of user equipments (UEs) connected via the respective beams.

Aspect 5: The method of any of Aspects 1-4, wherein a set of the one or more communications includes a first communication directed to a first user equipment (UE) via a beam of the one or more beams and a second communication directed to a second UE via the beam of the one or more beams, and wherein the forwarding the one or more communications via the one or more beams of the set of beams comprises: forwarding the first communication via a first subset of the set of time and frequency resources, the first subset associated with the beam, and forwarding the second communication via a second subset of the set of time and frequency resources, the second subset associated with the beam and being different from the first subset.

Aspect 6: The method of any of Aspects 1-5, wherein a beam of the set of beams has no connected user equipments (UEs), and wherein the beam is not allocated time and frequency resources for forwarding communications.

Aspect 7: The method of any of Aspects 1-6, wherein a first subset of the set of time and frequency resources associated with a first beam is time-division multiplexed with a second subset of the set of time and frequency resources associated with a second beam, or wherein the first subset of the set of time and frequency resources associated with the first beam is frequency-division multiplexed with the second subset of the set of time and frequency resources associated with the second beam.

Aspect 8: The method of any of Aspects 1-7, further comprising transmitting, to the parent network node, an indication of support for one or more of: frequency-division multiplexing communications via a first beam and a second beam of the set of beams, a number of beams that can be included in the set of beams, mapping of time and frequency resources to the set of beams of the network node for downlink communications, or mapping of time and frequency resources to the set of beams of the network node for uplink communications.

Aspect 9: The method of Aspect 8, further comprising transmitting, from the parent network node, an indication of an update to one or more of: the number of beams supported for the set of beams, support for mapping of time and frequency resources to the set of beams of the network node for downlink communications, or support for mapping of time and frequency resources to the set of beams of the network node for uplink communications.

Aspect 10: The method of any of Aspects 1-9, further comprising: receiving reference signals for forwarding; and forwarding the reference signals via the set of beams.

Aspect 11: The method of Aspect 10, further comprising: providing a connection between the parent network node and one or more user equipments (UEs) via the one or more beams of the set of beams based at least in part on the reference signals.

Aspect 12: The method of any of Aspects 1-11, further comprising: receiving, from the parent network node, an indication of one or more parameters for the mapping of time and frequency resources to the set of beams of the network node, and wherein the network node provides connections between the parent network node and a first user equipment (UE) and between the parent network node and a second UE. wherein the network node provides connections between the parent network node and a first user equipment (UE) and between the parent network node and a second UE.

Aspect 13: The method of Aspect 12, wherein the one or more parameters for the mapping of time and frequency resources to the set of beams of the network node comprise one or more of: whether to use one or more of time-division multiplexing of the one or more beams or frequency-division multiplexing of the one or more beams, a time gap for time division multiplexing of the one or more beams, a frequency gap for frequency division multiplexing of the one or more beams, whether to use the mapping of time and frequency resources to the set of beams of the network node for an uplink data channel, or whether to use the mapping of time and frequency resources to the set of beams of the network node for a downlink data channel.

Aspect 14: The method of any of Aspects 1-13, further comprising: receiving, from the parent network node, an indication of a schedule of a subset of the set of time and frequency resources mapped to a beam; and forwarding, via the beam, the indication to a user equipment (UE) connected to the parent network node via the beam.

Aspect 15: The method of any of Aspects 1-14, further comprising: receiving, via the one or more beams, a set of uplink communications via time and frequency resources mapped to the one or more beams.

Aspect 16: A method of wireless communication performed by a parent network node, comprising: transmitting an indication of a mapping of time and frequency resources to a set of beams of a network node; and transmitting, from the parent network node, one or more communications for forwarding via the set of beams using a set of time and frequency resources, the one or more communications being associated with the set of time and frequency resources mapped to one or more beams.

Aspect 17: The method of Aspect 16, wherein an amount of time and frequency resources allocated to respective beams of the set of beams is based at least in part on one or more of: an amount of data communicated via the respective beams, or a number of user equipments (UEs) connected via the respective beams.

Aspect 18: The method of any of Aspects 16-17, further comprising: transmitting an indication of an update to the mapping of time and frequency resources to the set of beams of the network node.

Aspect 19: The method of Aspect 18, wherein the update to the mapping of time and frequency resources to the set of beams of the network node is based at least in part on: amounts of data communicated via respective beams, or a number of user equipments (UEs) connected via the respective beams.

Aspect 20: The method of any of Aspects 16-19, wherein a set of the one or more communications includes a first communication directed to a first user equipment (UE) via a beam of the one or more beams and a second communication directed to a second UE via the beam of the one or more beams, wherein the first communication is associated with a first subset of the set of time and frequency resources, the first subset associated with the beam, and wherein the second communication is associated with a second subset of the set of time and frequency resources, the second subset associated with the beam and being different from the first subset.

Aspect 21: The method of any of Aspects 16-20, wherein a beam of the set of beams has no connected user equipments (UEs), and wherein the beam is not allocated time and frequency resources for forwarding communications.

Aspect 22: The method of any of Aspects 16-21, wherein a first subset of the set of time and frequency resources associated with a first beam is time-division multiplexed with a second subset of the set of time and frequency resources associated with a second beam, or wherein the first subset of the set of time and frequency resources associated with the first beam is frequency-division multiplexed with the second subset of the set of time and frequency resources associated with the second beam.

Aspect 23: The method of any of Aspects 16-22, further comprising receiving an indication of support for one or more of: frequency-division multiplexing communications via a first beam and a second beam of the set of beams, a number of beams that can be included in the set of beams, mapping of time and frequency resources to the set of beams of the network node for downlink communications, or mapping of time and frequency resources to the set of beams of the network node for uplink communications.

Aspect 24: The method of Aspect 23, further comprising receiving, from the parent network node, an indication of an update to one or more of: the number of beams supported for the set of beams, support for mapping of time and frequency resources to the set of beams of the network node for downlink communications, or support for mapping of time and frequency resources to the set of beams of the network node for uplink communications.

Aspect 25: The method of any of Aspects 16-24, further comprising: transmitting reference signals for forwarding via the set of beams.

Aspect 26: The method of Aspect 25, further comprising: establishing, via one or more beams of the set of beams, a connection with one or more user equipments (UEs) via the network node based at least in part on the reference signals.

Aspect 27: The method of any of Aspects 16-26, further comprising: transmitting an indication of one or more parameters for the mapping of time and frequency resources to the set of beams of the network node, and wherein the network node provides connections between the parent network node and a first user equipment (UE) and between the parent network node and a second UE. wherein the network node provides connections between the parent network node and a first user equipment (UE) and between the parent network node and a second UE.

Aspect 28: The method of Aspect 27, wherein the one or more parameters for the mapping of time and frequency resources to the set of beams of the network node comprise one or more of: whether to use one or more of time-division multiplexing of the one or more beams or frequency-division multiplexing of the one or more beams, a time gap for time division multiplexing of the one or more beams, a frequency gap for frequency division multiplexing of the one or more beams, whether to use the mapping of time and frequency resources to the set of beams of the network node for an uplink data channel, or whether to use the mapping of time and frequency resources to the set of beams of the network node for a downlink data channel.

Aspect 29: The method of any of Aspects 16-28, further comprising: providing, to a user equipment (UE) connected to the parent network node via a beam of the network node, an indication of a schedule of a subset of the set of time and frequency resources mapped to a beam.

Aspect 30: The method of any of Aspects 16-29, further comprising: receiving, via the network node, a set of uplink communications, wherein resources allocated to the set of uplink communications are mapped to the set of beams. wherein resources allocated to the set of uplink communications are mapped to the set of beams.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network node, comprising:
   receiving, from a parent network node, an indication of a mapping of time and frequency resources to a set of beams of the network node;
   receiving, from the parent network node, one or more communications for forwarding via the set of beams using a set of time and frequency resources;
   forwarding the one or more communications via one or more beams of the set of beams based at least in part on the one or more communications being associated with the set of time and frequency resources, the set of time and frequency resources being mapped to the one or more beams according to the mapping of the time and frequency resources to the set of beams;
   receiving, from the parent network node, an indication of a schedule of a subset of the set of time and frequency resources mapped to a beam; and
   forwarding, via the beam, the indication of the schedule.

2. The method of claim 1, wherein an amount of time and frequency resources allocated to respective beams of the set of beams is based at least in part on one or more of:
   an amount of data communicated via the respective beams, or
   a number of user equipments (UEs) connected via the respective beams.

3. The method of claim 1, further comprising:
   receiving, from the parent network node, an indication of an update to the mapping of time and frequency resources to the set of beams.

4. The method of claim 3, wherein the update to the mapping of time and frequency resources to the set of beams is based at least in part on:
   amounts of data communicated via respective beams, or
   a number of user equipments (UEs) connected via the respective beams.

5. The method of claim 1, wherein a set of the one or more communications includes a first communication directed to a first user equipment (UE) via at least one beam of the one or more beams and a second communication directed to a second UE via the at least one beam, and
   wherein the forwarding the one or more communications via the one or more beams of the set of beams comprises:
      forwarding the first communication via a first subset of the set of time and frequency resources, the first subset associated with the at least one beam, and
      forwarding the second communication via a second subset of the set of time and frequency resources, the second subset associated with the at least one beam and being different from the first subset.

6. The method of claim 1, wherein at least one beam of the set of beams has no connected user equipments (UEs), and wherein the at least one beam is not allocated time and frequency resources for forwarding communications.

7. The method of claim 1, wherein a first subset of the set of time and frequency resources associated with a first beam of the set of beams is time-division multiplexed with a second subset of the set of time and frequency resources associated with a second beam of the set of beams, or wherein the first subset of the set of time and frequency resources associated with the first beam is frequency-division multiplexed with the second subset of the set of time and frequency resources associated with the second beam.

8. The method of claim 1, further comprising:
   transmitting, to the parent network node, an indication of support for one or more of:
      frequency-division multiplexing communications via a first beam of the set of beams and a second beam of the set of beams,
      a number of beams that can be included in the set of beams,
      the mapping of time and frequency resources to the set of beams for downlink communications, or
      the mapping of time and frequency resources to the set of beams for uplink communications.

9. The method of claim 8, further comprising:
   transmitting, to the parent network node, an indication of an update to one or more of:
      the number of beams supported for the set of beams, support for the mapping of time and frequency resources to the set of beams for the downlink communications, or support for the mapping of time and frequency resources to the set of beams for the uplink communications.

10. The method of claim 1, further comprising:
receiving, from the parent network node, reference signals for forwarding; and
forwarding the reference signals via the set of beams.

11. The method of claim 10, further comprising:
providing a connection between the parent network node and one or more user equipments (UEs) via the one or more beams of the set of beams based at least in part on the reference signals.

12. The method of claim 1, further comprising:
receiving, from the parent network node, an indication of one or more parameters for the mapping of time and frequency resources to the set of beams, and wherein the network node provides connections between the parent network node and a first user equipment (UE) and between the parent network node and a second UE.

13. The method of claim 12, wherein the one or more parameters for the mapping of time and frequency resources to the set of beams comprise one or more of:
whether to use one or more of time-division multiplexing of the one or more beams or frequency-division multiplexing of the one or more beams,
a time gap for time division multiplexing of the one or more beams,
a frequency gap for frequency division multiplexing of the one or more beams,
whether to use the mapping of time and frequency resources to the set of beams for an uplink data channel, or
whether to use the mapping of time and frequency resources to the set of beams for a downlink data channel.

14. The method of claim 1,
wherein forwarding the indication of the schedule via the beam comprises:
forwarding the indication of the schedule to a user equipment (UE) connected to the parent network node via the beam.

15. The method of claim 1, further comprising:
receiving, via the one or more beams, a set of uplink communications via time and frequency resources mapped to the one or more beams.

16. A method of wireless communication performed by a parent network node, comprising:
transmitting an indication of a mapping of time and frequency resources to a set of beams of a network node;
transmitting one or more communications for forwarding by the network node via the set of beams using a set of time and frequency resources, the one or more communications being associated with the set of time and frequency resources mapped to one or more beams; and
transmitting an indication of a schedule of a subset of the set of time and frequency resources mapped to a beam, wherein the indication of the schedule is for forwarding by the network node via the beam.

17. The method of claim 16, wherein an amount of time and frequency resources allocated to respective beams of the set of beams is based at least in part on one or more of:
an amount of data communicated via the respective beams, or
a number of user equipments (UEs) connected via the respective beams.

18. The method of claim 16, further comprising:
transmitting an indication of an update to the mapping of time and frequency resources to the set of beams.

19. The method of claim 18, wherein the update to the mapping of time and frequency resources to the set is based at least in part on:
amounts of data communicated via respective beams, or
a number of user equipments (UEs) connected via the respective beams.

20. The method of claim 16, wherein a set of the one or more communications includes a first communication directed to a first user equipment (UE) via at least one beam of the one or more beams and a second communication directed to a second UE via the at least one beam of the one or more beams, wherein the first communication is associated with a first subset of the set of time and frequency resources, the first subset associated with the at least one beam, and wherein the second communication is associated with a second subset of the set of time and frequency resources, the second subset associated with the at least one beam and being different from the first subset.

21. The method of claim 16, wherein at least one beam of the set of beams has no connected user equipments (UEs), and wherein the at least one beam is not allocated time and frequency resources for forwarding communications.

22. The method of claim 16, wherein a first subset of the set of time and frequency resources associated with a first beam of the set of beams is time-division multiplexed with a second subset of the set of time and frequency resources associated with a second beam of the set of beams, or wherein the first subset of the set of time and frequency resources associated with the first beam is frequency-division multiplexed with the second subset of the set of time and frequency resources associated with the second beam.

23. The method of claim 16, further comprising:
receiving an indication of support for one or more of:
frequency-division multiplexing communications via a first beam of the set of beams and a second beam of the set of beams,
a number of beams that can be included in the set of beams,
the mapping of time and frequency resources to the set of beams for downlink communications, or
the mapping of time and frequency resources to the set of beams for uplink communications.

24. The method of claim 23, further comprising:
receiving an indication of an update to one or more of:
the number of beams supported for the set of beams,
support for the mapping of time and frequency resources to the set of beams for the downlink communications, or
support for the mapping of time and frequency resources to the set of beams for the uplink communications.

25. The method of claim 16, further comprising:
transmitting reference signals for forwarding via the set of beams.

26. The method of claim 25, further comprising:
establishing, via one or more beams of the set of beams, a connection with one or more user equipments (UEs) via the network node based at least in part on the reference signals.

27. The method of claim 16, further comprising:
transmitting an indication of one or more parameters for the mapping of time and frequency resources to the set of beams, and wherein the network node provides connections between the parent network node and a first user equipment (UE) and between the parent network node and a second UE.

28. The method of claim 27, wherein the one or more parameters for the mapping of time and frequency resources to the set of beams comprise one or more of:
whether to use one or more of time-division multiplexing of the one or more beams or frequency-division multiplexing of the one or more beams,
a time gap for time division multiplexing of the one or more beams,
a frequency gap for frequency division multiplexing of the one or more beams,
whether to use the mapping of time and frequency resources to the set of beams for an uplink data channel, or
whether to use the mapping of time and frequency resources to the set of beams for a downlink data channel.

29. The method of claim 16, wherein transmitting the indication of the schedule comprises:
transmitting the indication of the schedule to a user equipment (UE) connected to the parent network node via the beam.

30. The method of claim 16, further comprising:
receiving, via the network node, a set of uplink communications,
wherein resources allocated to the set of uplink communications are mapped to the set of beams.

31. A network node for wireless communication, comprising:
a memory; and
one or more processors, coupled to the memory, configured to:
receive, from a parent network node, an indication of a mapping of time and frequency resources to a set of beams of the network node;
receive, from the parent network node, one or more communications for forwarding via the set of beams using a set of time and frequency resources;
forward the one or more communications via one or more beams of the set of beams based at least in part on the one or more communications being associated with the set of time and frequency resources, the set of time and frequency resources being mapped to the one or more beams according to the mapping of the time and frequency resources to the set of beams;
receive, from the parent network node, an indication of a schedule of a subset of the set of time and frequency resources mapped to a beam; and
forward, via the beam, the indication of the schedule.

32. The network node of claim 31, wherein the one or more processors are further configured to:
receive, from the parent network node, an indication of an update to the mapping of time and frequency resources to the set of beams.

33. The network node of claim 31, wherein the one or more processors are further configured to transmit, to the parent network node, an indication of support for one or more of:
frequency-division multiplexing communications via a first beam of the set of beams and a second beam of the set of beams,
a number of beams that can be included in the set of beams,
the mapping of time and frequency resources to the set of beams for downlink communications, or
the mapping of time and frequency resources to the set of beams for uplink communications.

34. The network node of claim 33, wherein the one or more processors are further configured to transmit, to the parent network node, an indication of an update to one or more of:
the number of beams supported for the set of beams,
support for the mapping of time and frequency resources to the set of beams for the downlink communications, or
support for the mapping of time and frequency resources to the set of beams for the uplink communications.

35. The network node of claim 31, wherein the one or more processors are further configured to:
receive, from the parent network node, reference signals for forwarding; and
forward the reference signals via the set of beams.

36. The network node of claim 35, wherein the one or more processors are further configured to:
provide a connection between the parent network node and one or more user equipments (UEs) via the one or more beams of the set of beams based at least in part on the reference signals.

37. The network node of claim 31, wherein the one or more processors are further configured to:
receive, from the parent network node, an indication of one or more parameters for the mapping of time and frequency resources to the set of beams, and wherein the network node provides connections between the parent network node and a first user equipment (UE) and between the parent network node and a second UE.

38. The network node of claim 31, wherein the one or more processors, to forward the indication of the schedule via the beam, are configured to:
forward the indication of the schedule to a user equipment (UE) connected to the parent network node via the beam.

39. The network node of claim 31, wherein the one or more processors are further configured to:
receive, via the one or more beams, a set of uplink communications via time and frequency resources mapped to the one or more beams.

40. A parent network node for wireless communication, comprising:
a memory; and
one or more processors, coupled to the memory, configured to:
transmit an indication of a mapping of time and frequency resources to a set of beams of a network node;
transmit one or more communications for forwarding by the network node via the set of beams using a set of time and frequency resources, the one or more communications being associated with the set of time and frequency resources mapped to one or more beams; and
transmit an indication of a schedule of a subset of the set of time and frequency resources mapped to a beam, wherein the indication of the schedule is for forwarding by the network node via the beam.

41. The parent network node of claim 40, wherein an amount of time and frequency resources allocated to respective beams of the set of beams is based at least in part on one or more of:

an amount of data communicated via the respective beams, or a number of user equipments (UEs) connected via the respective beams.

42. The parent network node of claim 40, wherein a first subset of the set of time and frequency resources associated with a first beam of the set of beams is time-division multiplexed with a second subset of the set of time and frequency resources associated with a second beam of the set of beams, or wherein the first subset of the set of time and frequency resources associated with the first beam is frequency-division multiplexed with the second subset of the set of time and frequency resources associated with the second beam.

43. The parent network node of claim 40, wherein the one or more processors are further configured to:

transmit an indication of one or more parameters for the mapping of time and frequency resources to the set of beams, and wherein the network node provides connections between the parent network node and a first user equipment (UE) and between the parent network node and a second UE.

\* \* \* \* \*